US008869215B2

(12) United States Patent
Codadeen

(10) Patent No.: US 8,869,215 B2
(45) Date of Patent: Oct. 21, 2014

(54) METHOD AND SYSTEM FOR SWITCHING SUBSCRIBER CONTENT

(75) Inventor: Joseph Codadeen, London (GB)

(73) Assignee: Nokia Corporation, Espoo (FI)

( * ) Notice: Subject to any disclaimer, the term of this patent is extended or adjusted under 35 U.S.C. 154(b) by 124 days.

(21) Appl. No.: 12/919,761

(22) PCT Filed: Feb. 25, 2009

(86) PCT No.: PCT/GB2009/000521
§ 371 (c)(1),
(2), (4) Date: Aug. 26, 2010

(87) PCT Pub. No.: WO2009/106818
PCT Pub. Date: Sep. 3, 2009

(65) Prior Publication Data
US 2011/0047584 A1 Feb. 24, 2011

(30) Foreign Application Priority Data

Feb. 26, 2008 (GB) .................................. 0803502.4

(51) Int. Cl.
H04N 7/18 (2006.01)
H04N 7/167 (2011.01)
(Continued)

(52) U.S. Cl.
CPC ......... H04N 7/1675 (2013.01); H04N 21/6543 (2013.01); H04N 21/4627 (2013.01); H04L 63/083 (2013.01); H04N 21/654 (2013.01); H04N 21/41407 (2013.01); H04N 21/6332 (2013.01); H04N 21/25875 (2013.01)
USPC .......................................................... 725/83

(58) Field of Classification Search
None
See application file for complete search history.

(56) References Cited

U.S. PATENT DOCUMENTS 6,947,704 B1 * 9/2005 Takasao et al. .............. 455/3.06
2003/0084306 A1 5/2003 Abburi
(Continued)

FOREIGN PATENT DOCUMENTS

EP 1796389 A 6/2007
GB 2403105 A 12/2004
(Continued)

OTHER PUBLICATIONS

Search Report received in corresponding Great Britain Application No. GB0803502.4, Jun. 18, 2008, 1 page.
(Continued)

Primary Examiner — Nathan Flynn
Assistant Examiner — Omar S Parra
(74) Attorney, Agent, or Firm — Ditthavong & Steiner, P.C.

(57) ABSTRACT

Embodiments of the present invention provide that a content provider itself provide subscription content to a device of a second type, rather than to a device of a first type. For example, the device of the second type may be a mobile telephone or the like, while the device of the first type may be a set-top box. By providing the content itself the content provider can keep track as to when it is providing content to the device of the second type, and further, in some embodiments, take action to prevent reproduction of the content at the device of the first type, such that while the user is viewing the subscriber content on the device of the second type, another user is not able to view the same content on the device of the first type. In order to provide such an arrangement, the content provider is preferably provided with suitable content encoding and streaming server apparatus, which is able to encode the content in a format appropriate for transmission to the device of the second type (such as, for example, transmission to a mobile device.

18 Claims, 4 Drawing Sheets

(51) Int. Cl.
*H04N 21/6543* (2011.01)
*H04N 21/4627* (2011.01)
*H04N 21/654* (2011.01)
*H04N 21/414* (2011.01)
*H04N 21/6332* (2011.01)
*H04N 21/258* (2011.01)
*H04L 29/06* (2006.01)

(56) References Cited

U.S. PATENT DOCUMENTS

2006/0256751 A1* 11/2006 Jagadeesan et al. .......... 370/331
2006/0259927 A1 11/2006 Acharya
2007/0061725 A1* 3/2007 Isaac et al. .................... 715/717
2007/0276925 A1 11/2007 La Joie et al.
2007/0280477 A1 12/2007 Norin et al.
2008/0134245 A1* 6/2008 DaCosta ......................... 725/44
2008/0209497 A1* 8/2008 Cordoba ....................... 725/134
2011/0209188 A1* 8/2011 Petersson et al. ............. 725/110

FOREIGN PATENT DOCUMENTS

| WO | 2007/000455 | A | 1/2007 |
| WO | 2008/005639 | A | 1/2008 |
| WO | 2008/014059 | A2 | 1/2008 |

OTHER PUBLICATIONS

International Search Report received in corresponding Patent Cooperation Treaty Application No. PCT/GB2009/000523, May 27, 2009, 10 pages.

* cited by examiner

US 8,869,215 B2

METHOD AND SYSTEM FOR SWITCHING SUBSCRIBER CONTENT

RELATED APPLICATION

This application was originally filed as PCT Application No. PCT/GB2009/000521 filed Feb. 25, 2008, which claims priority benefit to Great Britain Patent Application No. 0803502.4, filed Feb. 26, 2008.

TECHNICAL FIELD

The present invention relates to a method and system for switching between devices which receive subscriber content, such as, in embodiments, pay per view television, or the like.

BACKGROUND TO THE INVENTION AND PRIOR ART

It is known that consumers can pay for entertainment content, such as pay per view television, provided by companies such as Sky Television, or the like. FIG. 1 illustrates a typical arrangement of such a pay per view system. Here, a user has a home display 20, such as a TV set, or the like, which is typically accompanied by a receiver, for receiving, decoding, and reproducing content signals for display on the home display 20. Such a receiver is commonly referred to as a "set top box", such as set top box 14. Commonly, the set top box receives signals 14 via a satellite connection, as represented by satellite 18, transmitting signals between transmitter satellite dish 11, and the receiver satellite dish 16, installed at a user's home. Typically, the receiver satellite dish 16 will be a very small aperture terminal, as is well known in the art.

To control what content the user receives, typically the set top box will be provided with a card reader, into which a smart card is inserted which controls the decryption of encrypted subscriber content channels. The set top box 14 is further often provided with a modem, which is able to communicate via the public switched telephone network 12 back to the back end systems of the content provider 10. The content provider 10 therefore broadcasts content channels via its own satellite transmitter 11, and is also able to control the user set top boxes 14, using the connection thereto over the PSTN 12.

Thus, for example, the content provider 10 is able to send suitable enable and disable signals via the PSTN 12 to the set top box 14, so as to enable or disable the decryption of encrypted content channels, using the smart card inserted into the set top box.

Such systems are well known in the art, such as, for example, the Sky TV system, installed in many homes.

Recently there have been proposals to allow for subscription content to be forwarded from a set top box to a user's mobile device, such that the user can view the subscription content on the mobile device. One such proposal is that by the company ROK Entertainment, as was described in a press release dated 24 Mar. 2006 and published on the "Mobile Europe" website. In particular, here it is described how a home user may buy an additional box 22, which connects to the TV signal feed from the set top box 14. It also connects to the user's broadband modem (not shown). Inside the box 22 is an encoding engine 26 which encodes the TV signal into a format suitable for transmission over a mobile network. Also in the box is a streaming server 24. The streaming server 24 is connected to the user's broadband modem, such that external devices can connect to the streaming server 24, and receive the encoded content stream therefrom, via the Internet 28. It therefore becomes possible for a user to connect to his own server 24 in the box 22 via his mobile device 32, by having appropriate client software including the appropriate content decoders installed on the mobile device, and to connect via a mobile access network 30 which is capable of providing appropriate data bit rates (such as a GPRS, or 3G network). The user can then use the client software installed on the mobile device to connect via the mobile access network, which in turn has a gateway to the Internet 28, through to the server 24 in the box 22 provided at his home. The box 22 then effectively encodes and streams the output from the user's set box 14 over the Internet and via the mobile access network 30 to the user's mobile device 32, where it is reproduced.

The prior art also describes that the box 22 may send infrared signals to the set top box 14 in the home, so as to control the channel that is watched. The client software installed on the mobile device 32 is able to control a box 22 to perform this function.

However, such an arrangement has several disadvantages, both legal, and technical. In terms of the technical disadvantages the system requires that the user's broadband modem be connected to the Internet 28 at all times, such that the user of the mobile device 32 can connect to the server 24 in the box 22 through the broadband modem. However, leaving a broadband modem connected to the network can be problematic, and particularly where the modem also requires a user's PC to be left on. In particular, it can leave the PC open to potential malicious attacks, for example to try and obtain information from the PC, or to install Spyware, or the like, on the PC.

Additionally, there is also a potential legal problem with the arrangement, in that the user is usually only paying for one subscription, which typically means that the subscriber content may be reproduced on one display only, at once. However, because the set top box 14 is also able to output the subscriber content to the home display 20, as well as via the box 22 to the mobile device 32, then, although the user is only paying for one subscription, he is in fact able to watch it on two different devices. In fact, even two different users may be able to watch the same content, one on the home display, and one on the mobile device. This would typically be contrary to the terms and conditions of the user's contract with the content provider.

SUMMARY OF THE INVENTION

In order to address the above problems, embodiments of the present invention provide that the content provider itself provide content to a device of a second type, rather than to a device of a first type. For example, the device of the second type may be a mobile telephone or the like, whilst the device of the first type may be a set-top box. By providing the content itself the content provider can keep track as to when it is providing content to the device of the second type, and further, in some embodiments, take action to prevent reproduction of the content at the device of the first type, such that whilst the user is viewing the subscriber content on the device of the second type, another user is not able to view the same content on the device of the first type. In order to provide such an arrangement, the content provider is preferably provided with suitable content encoding and streaming server apparatus, which is able to encode the content in a format appropriate for transmission to the device of the second type (such as, for example, transmission to a mobile device in the same or a similar manner as in the prior art). Preferably, user authentication mechanisms are used to authenticate the user of a the device of the second type as a user who has actually subscribed to subscription content, and to reconcile the identity of a user of a device of the second type with the owner of a device of the first type. With such an arrangement it becomes possible for a content provider to provide subscription content to either a device of the first type or a device of the second type belonging to the same user, but to be sure that both devices at the same time are not able to reproduce the content. Additionally, the problem of the prior art relating to a user having to leave his broadband modem connected all the time is also solved, as a user is able to simply connect to the content provider when required. Thus, the user does not have the problems of his home broadband modem being connected to the Internet constantly.

In view of the above, from a first aspect there is provided a method of controlling reproduction of subscription content, comprising the steps of: transmitting subscription content to a first receiving device; determining that the subscription content is required by a second receiving device; disabling reproduction of the content by the first device; and commencing transmission of the content to the second receiving device; wherein the first and second devices have a common user.

From another aspect there is provided a method of controlling reproduction of subscription content, comprising the steps: determining which of a first receiving device or a second receiving device is required to reproduce subscription content; enabling, if necessary, reproduction of the subscription content on the determined device and disabling, if necessary, reproduction of the content at the other of the devices, whereby reproduction of the subscription content may occur on only one device at once; and wherein the first and second devices have a common user, and are devices of different types.

With such arrangements the subscription content can only be viewed on one device at once, and hence the terms of the subscription can be more closely adhered to. Moreover, there is no need for a user to maintain an Internet connection constantly, as the subscription content is provided directly from the content provided in respect of both devices.

In preferred embodiments the first and second devices are devices of different types. Preferably the first device is a set-top box, and more preferably the second device is a mobile device. Thus, subscriber content which is usually reproduced by a set top box can also be provided to a mobile device.

Preferably, where the first device is a set-top box it retains the ability to record the content for future reproduction whilst the reproduction of the content is disabled. In this way recordings which have been set can be successfully carried out, even though the user is reproducing the content on the second device.

Preferably the subscription content is encoded according to a first encoding format for transmission to the first device and according to a second encoding format for transmission to the second device. Thus, the content can be encoded into a format which optimises the transmission mechanism. For example, for a mobile device the content may need to be reduced in size to a large degree, for example using sub-sampling of the content, and appropriate encoding techniques. For a set-top box receiving the content via a broadcast link, typically the bandwidth will be relatively high (~6 Mhz per channel) and hence different encoding techniques can be used. Of course, different content channels may be multiplexed onto a single broadcast channel, as is well known in the art, such as in the DVB-T and DVB-S standards.

In particularly preferred embodiments reproduction of the subscription content by the first device is automatically re-enabled when the content is no longer required to be transmit to the second device. Therefore, the first device can act as a default device for receiving the content, and the user does not need to explicitly command the provision of subscriber content to be made back to the first device. Such arrangements are particularly preferable where the first device is a set-top box, which can commonly be set to make recordings of content automatically. However, if the set-top box has been disabled from receiving the content, such recordings may not be able to happen.

From a further aspect there is provided a system for controlling reproduction of subscription content, comprising: a first transmission system for transmitting subscription content to a first receiving device; an access controller which determines that the subscription content is required by a second receiving device and disables reproduction of the content by the first device; and a second transmission system for transmitting the content to the second receiving device; wherein the first and second devices have a common user.

From a yet further aspect there is provided a system for controlling reproduction of subscription content, comprising the steps: an access controller which determines which of a first receiving device or a second receiving device is required to reproduce subscription content; wherein the access controller enables, if necessary, reproduction of the subscription content on the determined device and disables, if necessary, reproduction of the content at the other of the devices, whereby reproduction of the subscription content may occur on only one device at once; and wherein the first and second devices have a common user, and are devices of different types.

Within the further aspects the same advantages are obtained as in the first aspect, and the same further features and advantages may also be obtained, as will be apparent from the appended claims.

BRIEF DESCRIPTION OF THE DRAWINGS

Further features and advantages of the present invention will become apparent from the following description of an embodiment thereof, presented by way of example only, and by reference to the accompanying drawings, wherein like reference numerals refer to like parts, and wherein:—

DESCRIPTION OF THE EMBODIMENT

Figure 1:
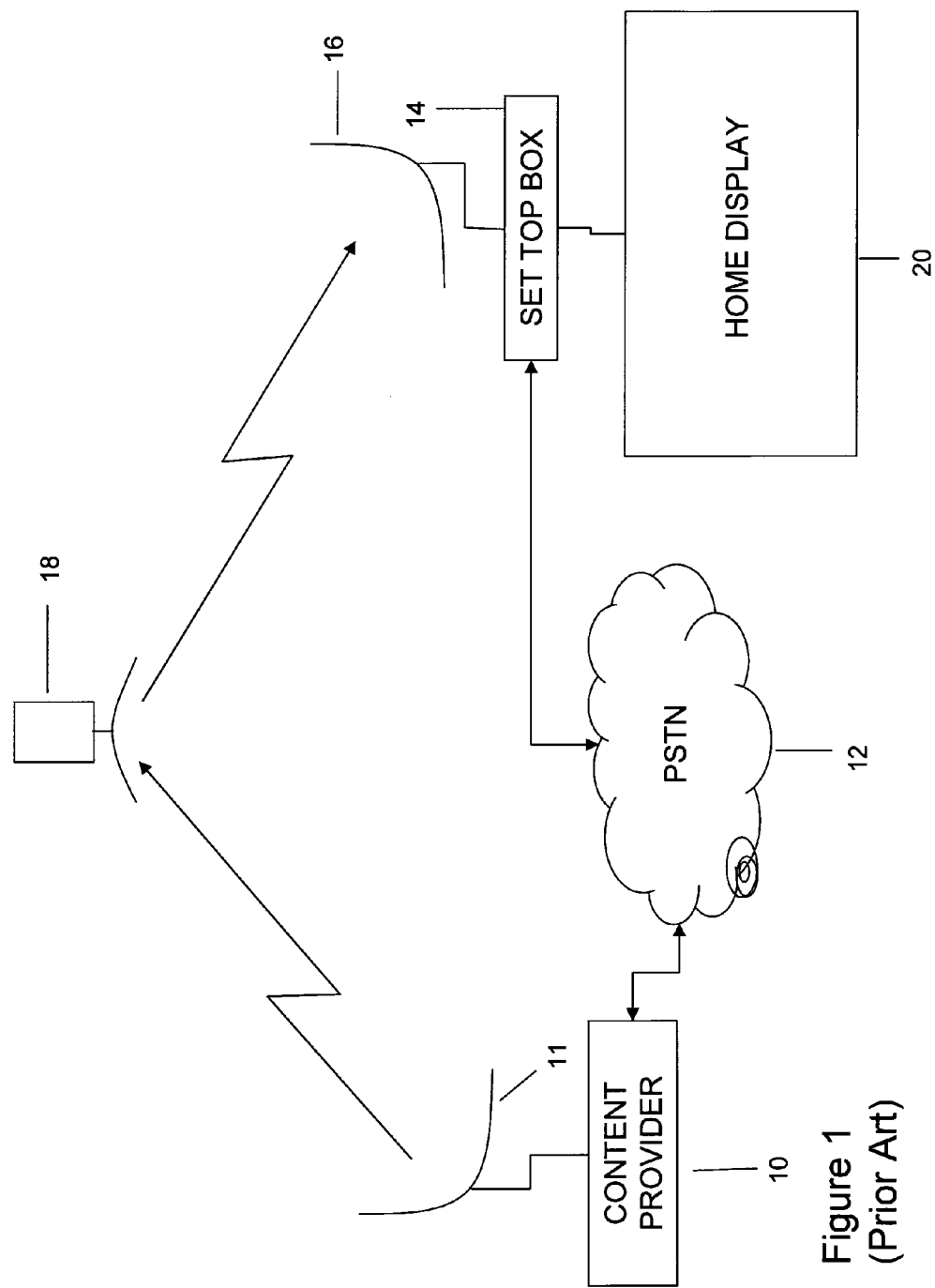
FIG. 1 is a block diagram of a subscription content transmission system of the prior art.
Figure 2:
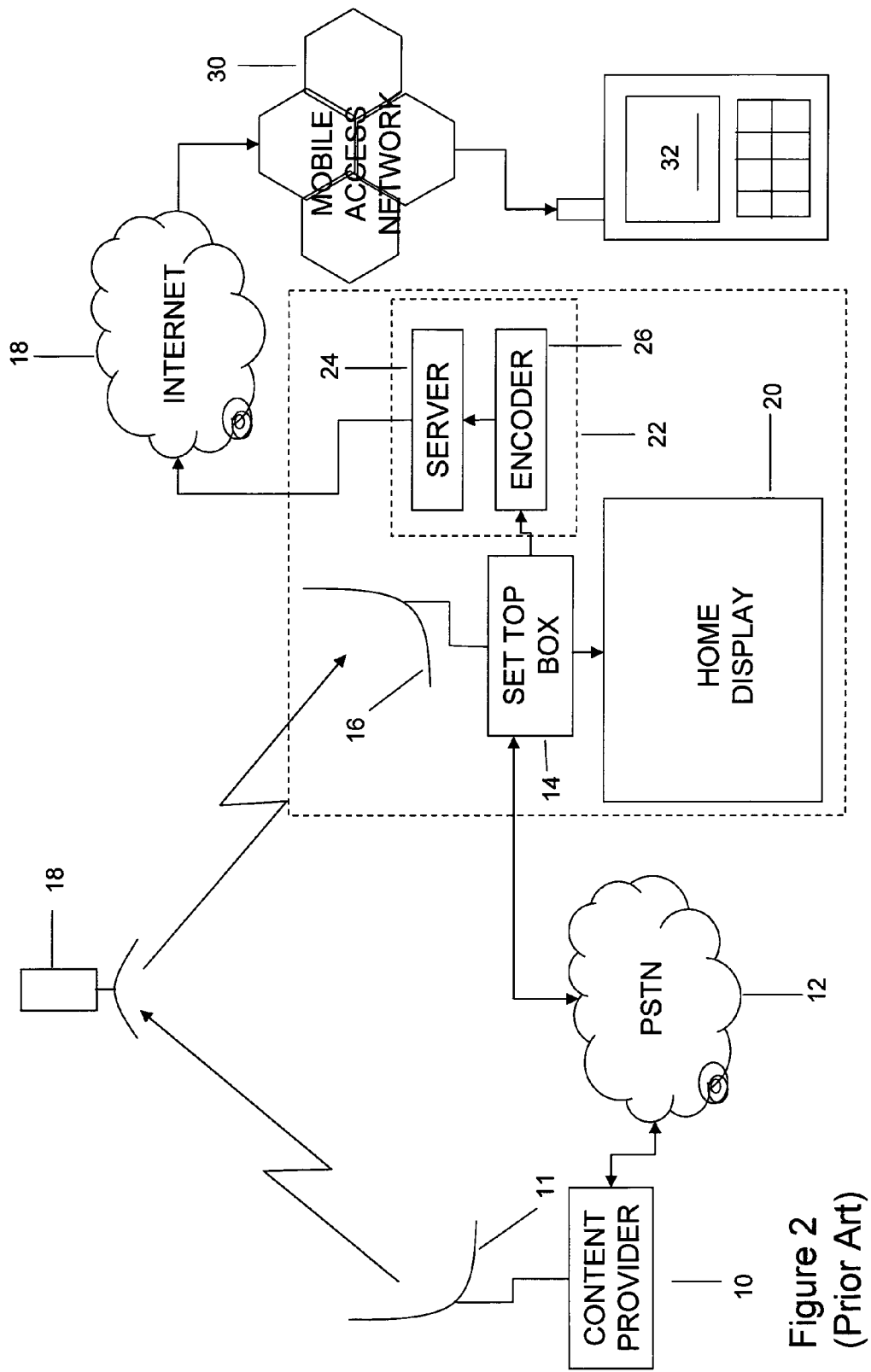
FIG. 2 is a block diagram of a subscriber content transmission system and onward streaming arrangement of the prior art.
Figure 3:
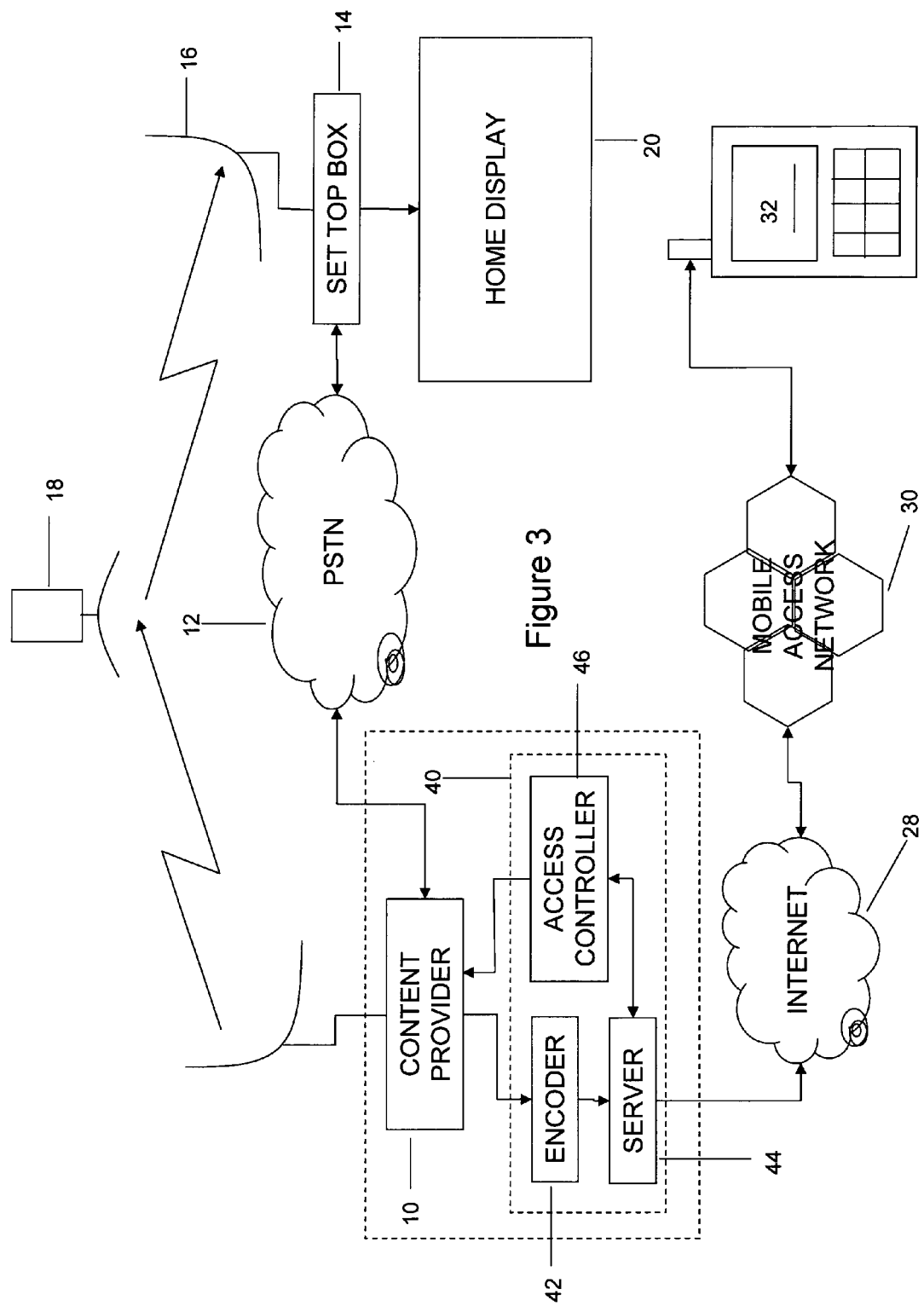
FIG. 3 is a block diagram of a system according to a first embodiment of the present invention.

FIG. 3 is a block diagram of a first embodiment of the present invention. FIG. 3 illustrates in particular a broadcast arrangement for broadcasting subscriber content from the transmission system of a content provider 10 to a home user provided with a set top box 14. In this respect, the same numbered reference numerals present in FIG. 3 are the same as the prior art in FIG. 1. Whilst the broadcast system is here shown as a satellite broadcast system, it should be appreciated that in other embodiments different broadcast systems may be used, such as terrestrial broadcast systems, transmission over the Internet, or the like. Hence, in other embodiments the set-top box may be for receiving terrestrially broadcast content, such as that which is broadcast in accordance with the DVB-T standards.

Different to the prior art, at the content provider end is a subscriber content encoding and streaming apparatus 40, comprising a content encoder 42, and a streaming server 44. Additionally provided is an access controller 46, which is operable to authenticate a user ID, and confirm that a user requesting access is able to receive encoded subscriber content streams. The server 44 is connected to the Internet 28, which itself is provided with a gateway to a mobile access network 30, such as a GPRS network, 3G network, or the like. A user is provided with a mobile handset 32, on which is installed appropriate client software to enable connection to the server 44, and to decode and reproduce any received encoded content.

Additionally, the content provider back end system 10 also connects to the set top box 14 via the PSTN 12 in the conventional manner, such that the content provider back end system 10 is able to enable or disable a decryption smart card provided in the set top box 14.

It will thus be appreciated that more generally the content provider is able to provide the subscription content to devices of two different types, being in this embodiment the set-top box 14 and the mobile handset 32. The content provider is thus provided with access to content transmission or transport systems of at least two different types, being in this case the broadcast transmission system for transmitting the subscription content to the set top box, and the content encoding and streaming apparatus 40 for streaming the suitably encoded content to the mobile handset via the Internet.

Figure 4:
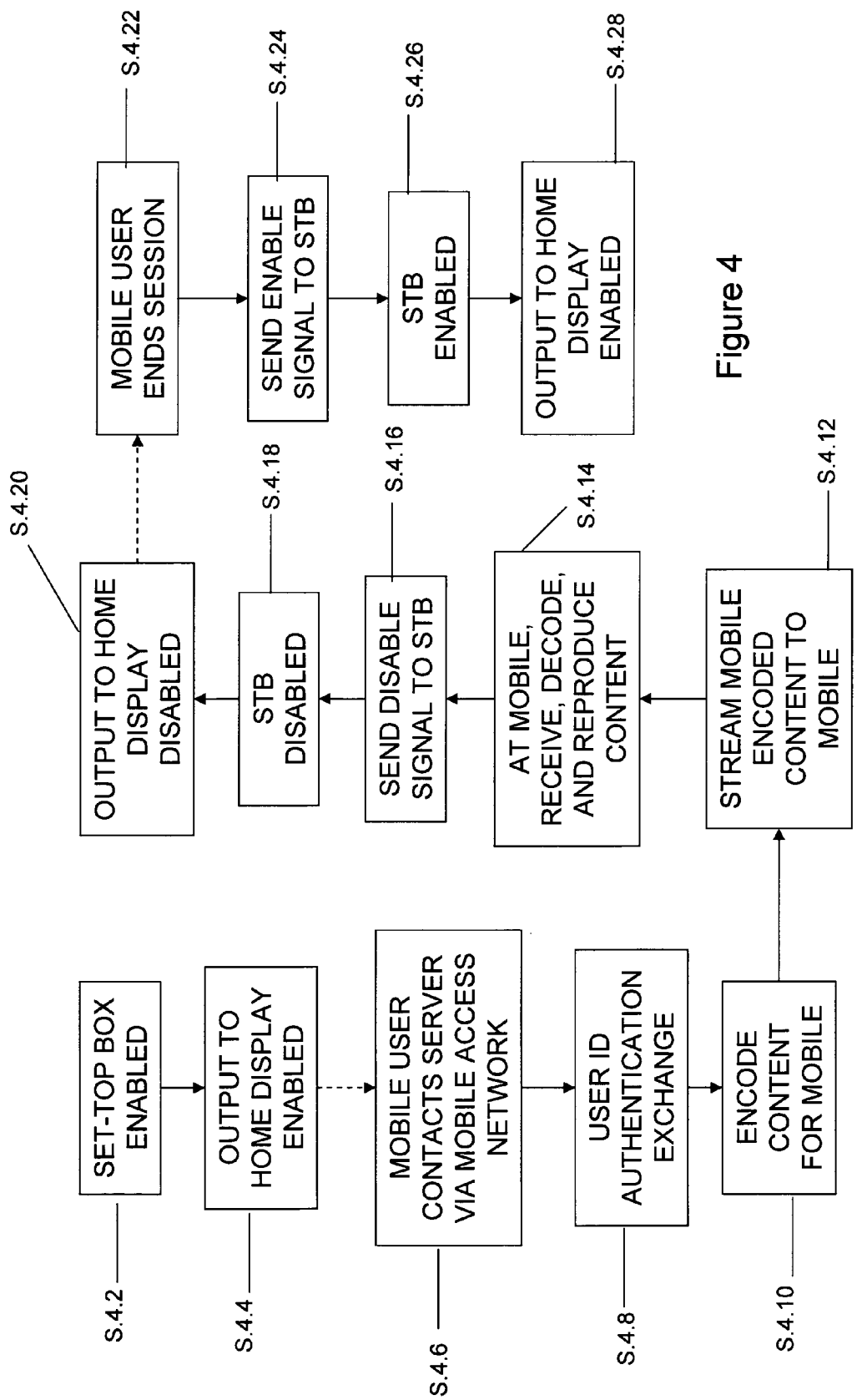
FIG. 4 is a flow diagram illustrating the steps performed in the operation of the first embodiment of the present invention.

FIG. 4 is a flow diagram illustrating the operation of the system of FIG. 3.

Firstly, assume at step 4.2 that the set top box 14 is enabled, and is outputting received, decrypted, and decoded content at step 4.4 to the home display 20, which then displays the subscriber content to a user, as required. This is the default position for the system, i.e. that the user usually receives the subscriber content at his home, which is decrypted by the set top box 14, and displayed on the home display 20.

However, imagine now that the user provided with the subscriber content subscription wishes to view the subscriber content on his mobile device 32. The user uses the appropriate client software installed on the mobile device 32 to establish firstly a data connection via the mobile access network 30 and the Internet 28 to the streaming server 44, at step 4.6. The user is provided in advance with a unique user ID, which is used to authenticate the user, to determine whether the mobile device 32 should receive the subscription content. This authentication exchange is controlled by the access controller 46, which stores valid user IDs at the present time, typically in a look up table. This look up table is dependent on the present subscription status of the user. That is, should the user fail to pay his subscription, or his subscription expire, then the user ID will be deleted from the look up table.

At step 4.8 there is, therefore, a user ID authentication exchange between the mobile device 32 and the server 44, wherein the user inputs his user ID (and possibly password) into the mobile device 32, which then transmits the data via a data connection over the mobile access network 30 and Internet 28 to the server 44. The server 44 passes the received information to the access controller 46, which determines whether there is a valid user ID (and password), and if so, informs the server 44 that access is allowed. If there is no valid user ID, then the access controller 46 informs the server 44, which then sends a refused access message back to the mobile handset 32.

If the user ID is successfully authenticated, then as mentioned the access controller 46 controls the server 44 to permit the server to start streaming data to the mobile device 32. At the same time, the access controller 46 informs the content provider back end system 10 that the user is receiving the subscriber content on his mobile handset. At step 4.10, therefore, the server 44 receives encoded subscriber content from the encoder 42, which itself receives the content to encode from the content provider back end system 10. At step 4.12 the server 44 streams the encoded content to the mobile via the Internet 28 and the mobile access network 30. At step 4.14 the mobile receives, decodes and reproduces the received streamed content. Steps 4.10, 4.12 and 4.14 are repeated ad infinitum, until the user shuts down the receiving client application on the device 32.

At the same time, the content provider back end system 10 sends, at step 4.16, a disable signal to the set top box 14, via the PSTN 12. This disable signal is sent in the conventional manner of the prior art, i.e. using the mechanism that is conventionally used to enable and disable smart cards inserted into set top boxes. At step 4.18 the set top box becomes disabled, and is then no longer able to receive and reproduce subscription content. Of course, the set top box may receive and reproduce non-subscription content, such as public channels or the like. At the same time, therefore, the output to the home display 20 of the subscription content is disabled, at step 4.20. The STB and the home display remain disabled with respect to receiving and displaying subscription content, whilst the user is using the mobile device 32 to receive the subscription content.

At some point the user will no longer wish to use the mobile device 32 to receive the subscription content, and will indicate that his receiving session is to end, typically by shutting down the client application. This may occur at step 4.22, as shown. Here, the server 44 indicates to the access controller 46 that the connection to the user is no longer in being, and the access controller 46 informs the content provider back end system 10 that it should now re-enable the set top box 14. Therefore, at step 4.24 the content provider back end system 10 sends, via the PSTN 12, a smart card enable signal to the smart card in the set top box 14, such that the set top box becomes re-enabled, and is able to receive and reproduce the subscription content.

In some embodiments, rather than the enable and disable signals being sent via the PSTN 12, they can be multiplexed onto the broadcast signal which is sent via satellite 18. In other embodiments, such as the terrestrial broadcast embodiments, the enable and disable signals may be multiplexed onto the terrestrial broadcast signal. In this way the invention may also be used with terrestrial subscription content services, such as the subscription content service available terrestrially in the UK known as "Top-UP TV". Once the STB has been enabled the output to the home display becomes re-enabled, at step 4.28. In this respect, steps 4.26 and steps 4.28 are substantially identical to steps 4.2, and steps 4.4 described previously.

With the above arrangement, therefore, control of which user device receives and reproduces subscription content can be retained with the content provider 10, such that the content provider can be assured that a single device is reproducing subscription content at any one time. Additionally, the user is also provided with the ability to access subscription content on his mobile device, via the Internet, and hence can access such content in theory anywhere in the world.

Additionally, when the user is not using his mobile device to access content, then the user's set top box 14 remains able to receive and reproduce the subscription content. Hence, if the set-top box is set to record any programmes, these recordings can still take place.

The subscription content may of course be audio and video content, data content, or any content for which a subscription is required. Additionally, whilst we have described the embodiment in terms of the provision of subscription content such as video content, in other embodiments the subscription content may be other types of data, and in particular other embodiments may find use where a content provider is concerned about a user accessing subscription content using multiple devices, and the content provider wishes to restrict the access of the user to the content to using one device at a time.

Additionally, in another modification to provide a further embodiment the set top box 14 may be provided with software which allows the user to select a command on the set top box which directs the content provider 10 to begin streaming data over the Internet and mobile access network to the mobile device 32. That is, the user would command the set top box 14 that he or she wishes to receive the subscription content on his mobile device, and the set top box 14 would then disable itself, and send a command to the content provider back end system 10 that the subscription content should begin to be encoded and streamed to the user's mobile device 32. Preferably, the user's mobile device 32 identification information, such as an IMEI or the like, is registered with the content provider back end system 10, so that a connection can be set up from the server end 44 to the mobile device 32.

Alternatively, the configuration of the system may be such that the user of the mobile device 32 must start his client application which then sets up the connection to the server 44 from the mobile device end.

In the above embodiments the set-top box is prevented from reproducing the subscription content whilst the subscription content is being provided to the user's mobile device. However, as noted previously some set-top boxes (usually known as Personal Video Recorders (PVRs)) also provide the capability to record content for reproduction in the future, at the user's convenience. In a further embodiment, therefore, whilst the user mobile device is receiving the subscription content the set-top box also retains the ability to receive and decrypt the content for recording purposes, but is prevented from re-producing the content, for example by outputting the content to the display for reproduction. This means that where the user has set the set-top box to record some of the subscription content then the recording may go ahead and will still be recorded, even though the user is receiving the subscription content on his mobile device. In this way, the successful completion of a recording is not dependent on whether the user is receiving content on the mobile device. The subscription content provider may charge the user extra for the use of this service.

The above described arrangement may be provided by differentiating between the control signals sent to the set-top box, either over the PSTN, or over the broadcast channel. More particularly, a first type of control signal may be sent to indicate that the set-top box should stop reproducing the subscription content altogether, even for recording purposes. A second type of control signal is then used to indicate to the set-top box that only reproduction of the subscription content is prevented, but that recording can occur.

Alternatively, the default operation may be that recording is always permitted even though reproduction is prevented. In this case, only one type of control signal is required i.e. the enable and disable signal discussed previously.

Within the above described embodiments we concentrate on providing the subscription content to devices of two different types, being a set-top box and a mobile telephone, such that the subscription content may be reproduced using only one device at once. Of course, in other embodiments other devices may be used. For example, a user may have a subscription for subscription content which is usually provided over the Internet to his desktop computer. However, in another embodiment of the invention the content may instead be re-routed to his mobile telephone. In this case the same transmission system is used, at least in part (being the Internet), but the routing applied to the content is different. Additionally, to meet the more exacting requirements of mobile transmission different content encoding schemes may be used.

In further embodiments other devices of different types may be used. The only requirement is that they are capable of receiving and reproducing the subscription content, using whichever transmission mechanism is applicable to them. For example, a portable media player equipped with a Wi-Fi (IEEE 802.11) transceiver and software to allow streaming connections to be established over the Internet would also be suitable. When the content provider was streaming subscription content to the media player over the Internet, then the set-top box would be disabled, as described previously. Additionally, no second streaming flow would be provided to the mobile telephone at the same time.

It should also be noted that in the above embodiments we have described the switching of the reproduction of the subscription content as being between a device of a first type and a device of a second type. However, embodiments of the invention are not limited to switching between two types, and in fact switching between three or more devices would be possible. For example, a user may be provided with a mobile telephone, a set-top box, and Wi-Fi enabled media player. When at home the user would use the set-top box to reproduce the content, in the conventional manner. When away from home, but not in range of any Wi-Fi hotspots, the user may use his mobile telephone to access the subscription content, using data connections available over the user's mobile network, again as described. When in range of a Wi-Fi hotspot (such as when in a hotel, airport, or railway station), the user may use his Wi-Fi enabled media player to access the subscription content over the Internet. Of course, the set top box would be disabled when subscription content is being streamed to the media player or the telephone, and content would only be provided to one of the media player or telephone at the same time.

Further modifications may be made to the above described embodiments to provide further embodiments, which are intended to fall within the scope of the appended claims.

The invention claimed is:

1. A method comprising:
    determining by an apparatus of a content provider to transmit content via a first network to at least a first device based upon a subscription of a user, wherein the apparatus is located outside of user premises;
    determining by the apparatus that the content is requested by a second device based upon the subscription, wherein the second device is a mobile device;
    determining by the apparatus to transmit the content via a second network to the second device based upon the subscription; and
    determining by the apparatus to transmit a control signal via the first network to the first device and to transmit the content via the second network to the second device respectively, wherein the control signal causes continuation of the content transmission to the first device and continuation of content recordation at the first device from a time point prior to the transmission of the control signal, while disabling reproduction of the content by the first device based upon the subscription.

2. A method of claim 1, wherein the first device is a set-top box, and the first network includes a public switched telephone network and excludes any mobile access network and data network,
wherein the first device and the second device have a common user and are devices of different types.

3. A method of claim 1, further comprising:
determining which of the first device or the second device is to reproduce the content,
wherein the determination to disable reproduction is based, at least in part, on the determination of which of the first device or the second device is to reproduce content.

4. A method of claim 1,
wherein the content is provided to the first device using a transmission system of a first type, and the content is provided to the second device using a transmission system of a second type.

5. A method of claim 2, wherein the set-top box retains an ability to record the content for a future reproduction while the reproduction of the content is disabled.

6. A method of claim 1, wherein the first network further includes a satellite network and the second network includes a mobile access network, a data network, or a combination thereof.

7. A method of claim 6, further comprising:
determining by the apparatus to transmit the control signal selectively via a public switched telephone network or the satellite network to disable reproduction of the content by the first device.

8. A method of claim 1, wherein the content is encoded according to a first encoding format for transmission to the first device and according to a second encoding format for transmission to the second device.

9. A method of claim 1, further comprising: determining to re-enable reproduction of the content by the first device when the content is no longer requested by the second device.

10. An apparatus comprising:
at least one processor; and
at least one memory including computer program code for one or more programs,
the at least one memory and the computer program code configured to, with the at least one processor, cause the apparatus of a content provider to perform at least the following,
determine to transmit content via a first network to at least a first device based upon a subscription of a user;
determine that the content is requested by a second device based upon the subscription, wherein the second device is a mobile device;
determine to transmit the content via a second network to the second device based upon the subscription; and
determine to transmit a control signal via the first network to the first device and to transmit the content via the second network to the second device respectively, wherein the control signal causes continuation of the content transmission to the first device and continuation of content recordation at the first device from a time point prior to the transmission of the control signal, while disabling reproduction of the content by the first device based upon the subscription,
wherein the apparatus is located outside of user premises.

11. An apparatus of claim 10, wherein the first device and the second device have a common user and are devices of different types.

12. An apparatus of claim 10, wherein the apparatus is further caused to:
determine which of the first device or the second device is to reproduce the content,
wherein the determination to disable reproduction is based, at least in part, on the determination of which of the first device or the second device is to reproduce content.

13. An apparatus of claim 10, wherein the content is provided to the first device using a transmission system of a first type, and the content is provided to the second device using a transmission system of a second type.

14. An apparatus of claim 12, wherein a set-top box retains an ability to record the content for a future reproduction while the reproduction of the content is disabled.

15. An apparatus of claim 10, wherein the content is encoded according to a first encoding format for transmission to the first device and according to a second encoding format for transmission to the second device.

16. An apparatus of claim 10, wherein the apparatus is further caused to:
determine to re-enable reproduction of the content by the first device when the content is no longer requested by the second device.

17. A non-transitory computer-readable storage medium carrying one or more sequences of one or more instructions which, when executed by one or more processors, cause an apparatus of a content provider to at least perform the following steps:
determining to transmit content via a first network to a first device based upon a subscription of a user;
determining that the content is requested by a second device based upon the subscription, wherein the second device is a mobile device;
determining to transmit the content via a second network to the second device based upon the subscription; and
determining to transmit a control signal via the first network to the first device and to transmit the content via the second network to the second device respectively, wherein the control signal causes continuation of the content transmission to the first device and continuation of content recordation at the first device from a time point prior to the transmission of the control signal, while disabling reproduction of the content by the first device based upon the subscription,
wherein the apparatus is located outside of user premises.

18. A non-transitory computer-readable storage medium of claim 17, wherein the first device and the second device have a common user and are devices of different types.

* * * * *